Figure 1:
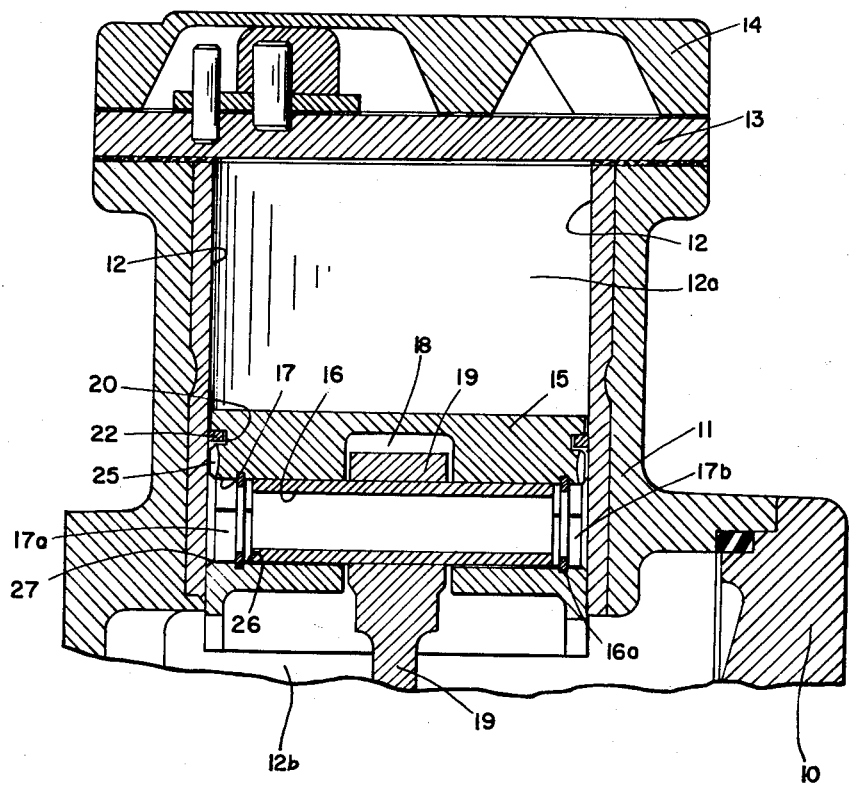

Oct. 10, 1961   F. E. LA FLAME ET AL   3,003,837
FLUID COMPRESSOR
Filed Aug. 6, 1959                              2 Sheets-Sheet 1

INVENTORS
FRANK E. LA FLAME
FRANK L. RIFNER
BY
D. C. Staley
ATTORNEY

Oct. 10, 1961   F. E. LA FLAME ET AL   3,003,837
FLUID COMPRESSOR
Filed Aug. 6, 1959   2 Sheets-Sheet 2

INVENTORS
FRANK E. LA FLAME
FRANK L. RIFNER
BY
D. C. Staley
ATTORNEY

United States Patent Office  3,003,837
Patented Oct. 10, 1961

3,003,837
FLUID COMPRESSOR
Frank E. La Flame and Frank L. Rifner, Dayton, Ohio, assignors to General Motors Corporation, Detroit, Mich., a corporation of Delaware
Filed Aug. 6, 1959, Ser. No. 832,053
2 Claims. (Cl. 309—6)

This invention relates to a fluid compressor, and particularly to a compressor adapted for compressing refrigeration gases by reciprocation of a piston within a cylinder.

One of the problems in the use of reciprocating compressors for compressing refrigeration gases is the oil leakage that tends to pass by the piston rings of the piston of the compressor in normal operation. A certain amount of oil is carried by the refrigeration gases in circulation in a refrigeration system, but it is desirable to prevent oil in the crankcase of the compressor from seeping by the piston rings of the piston of the compressor and thereby getting into the refrigeration system to lodge at some low point in the system.

To prevent oil in the crankcase from seeping past the compressor piston, it has been conventional to provide a separate oil groove and piston ring below the compression piston ring provided adjacent the top of the piston. The two-ring system does a respectable job of preventing oil in the compressor crankcase from getting into the refrigeration system. However, such a two-ring system is expensive and does not completely solve the problem involved.

It is therefore an object of this invention to provide a fluid compressor, and particularly a gas compressor, with passages located in the piston of the compressor such that they will provide for relief flow of oil from a piston ring groove provided in the piston to the crankcase of the compressor. One of the problems in connection with preventing oil seepage past the piston of the compressor and even past the piston rings is the fact that oil becomes entrapped in the piston ring grooves and between the rings of a dual-ring system with the result the oil pressure gradually increases to a point that it will flow by the normal compression ring for the piston and thereby enter the compression space in the cylinder and be delivered into the refrigeration system or the high-pressure side of the system in the event the compressor is used for normal gas compression.

An object of the invention is therefore to provide for relief of oil from the piston ring groove in the piston so that oil that may be entrapped below the compression ring of the piston may flow through relief passages into the crankcase of the compressor and thereby prevent build-up of pressure in the area of the entrapped oil such as would cause forcing of the oil to seep past the compression ring of the piston.

Another object of the invention is to accomplish the foregoing object by providing a relief passage between the piston ring groove and the piston pin bore of the piston whereby oil entrapped below the piston ring can flow into the piston pin bore, the piston pin bore being provided with oil relief passages that permit flow of oil from the piston pin bore into the cylinder area of the compressor below the piston and thereby into the crankcase of the compressor, the arrangement being such that oil pressure is prevented from developing in the area of entrapped oil below the piston ring of the piston.

Further objects and advantages of the present invention will be apparent from the following description, reference being had to the accompanying drawings wherein preferred embodiments of the present invention are clearly shown.

Figure 4:
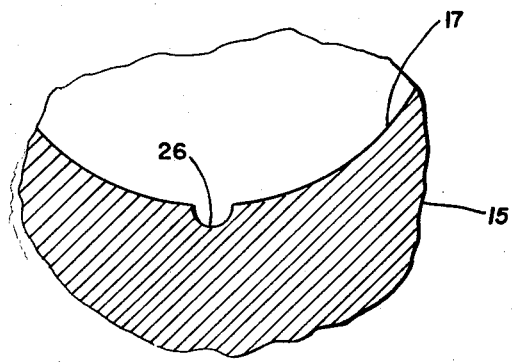
Figure 2:
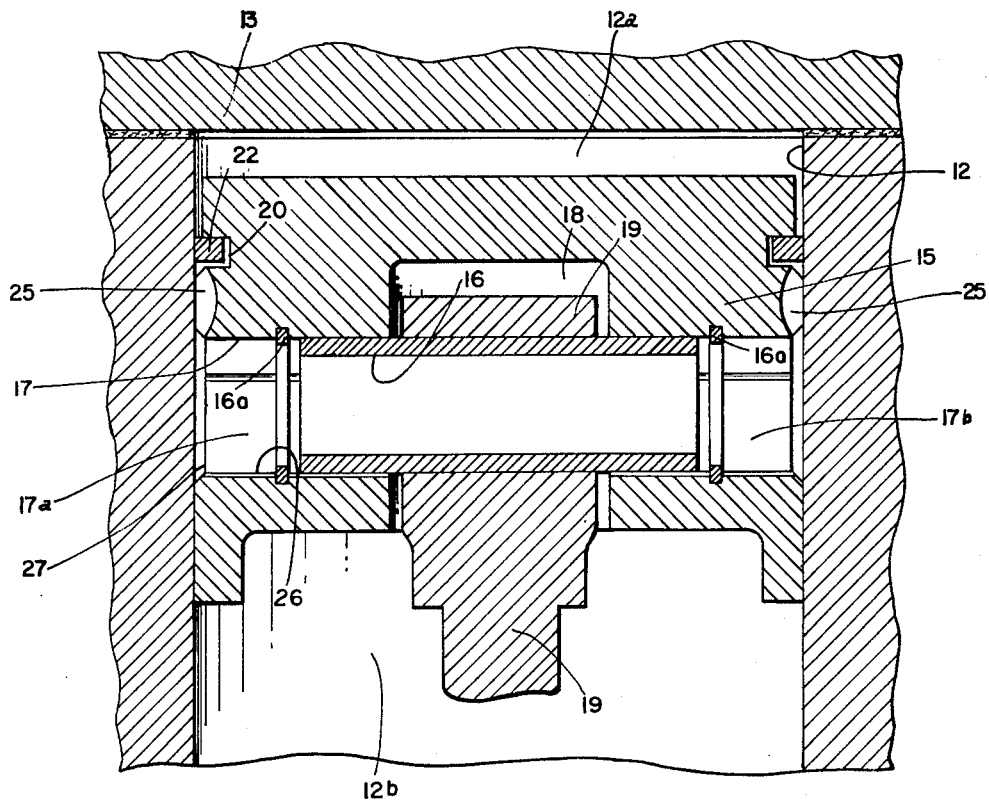
Figure 3:
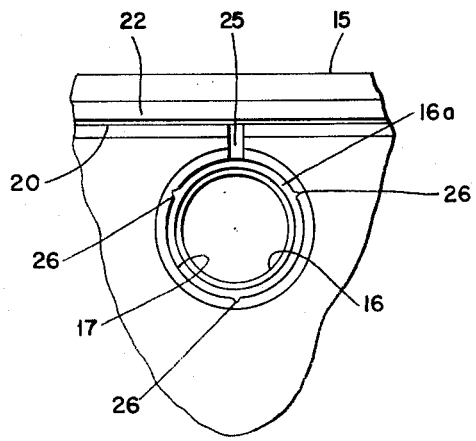

In the drawings:
FIG. 1 is a vertical cross-sectional view of a part of a gas compressor incorporating features of this invention.
FIG. 2 is an enlarged vertical cross-sectional view of the piston and cylinder illustrating the invention in more detail.
FIG. 3 is a partial side view of the piston showing an end view of the piston pin bore.
FIG. 4 is a still further enlarged view illustrating the oil relief grooves provided in the piston pin bore of the piston.

In this invention the fluid compressor consists of a body forming a crankcase 10 on which there is mounted a cylinder member 11, the cylinder member having a cylinder chamber 12. The cylinder chamber 12 is closed at the upper end by a valve plate 13 and a compressor head 14, the valve plate carrying suitable suction and compression valves to allow for intake of gas into the cylinder 12 and discharge of a compressed gas therefrom.

The cylinder 12 receives a piston 15 that is reciprocable therein. The piston 15 has a piston pin 16 extending transversely thereof in the piston pin bore 17 located centrally by the snap rings 16a. The piston pin 16 extends across a recess 18 in the central area of the piston 15, the recess area 18 being adapted to receive the upper end of a connecting rod 19 journalled on the piston pin 16. The connecting rod 19 is connected to a crankshaft (not shown) of the compressor for effecting reciprocation of the piston 15 in the cylinder 12.

The piston 15 has a piston ring groove 20 extending inwardly from the periphery of the piston adjacent the top wall 21 of the piston. The ring groove 20 receives a piston ring 22 that slidably engages the wall of the cylinder 12 and seals the compression chamber 12a of the cylinder from the crankcase connected area 12b.

Obviously, reciprocation of the piston 15 in the cylinder 12 will effect intake of low pressure gas into the compression area 12a on downward movement of the piston 15 through a suitable suction valve (not shown). Upward movement of the piston 15 will effect compression of the charge of gas taken into the compression chamber and will discharge the gas through a suitable discharge valve on the valve plate 13.

The compressor crankcase conventionally contains a body of oil that is used to effect lubrication of the bearings for the compressor crankshaft and of the bearings for the connecting rod at its point of attachment to the crankshaft. This lubrication of the bearings may be performed either as pressure lubrication by way of a small pump driven with the crankshaft of the compressor, or by way of splash lubrication.

In either event, however, there is a substantial disturbance in the body of the crankcase of the compressor and the journal surface between the connecting rod 19 and the piston pin 16 is adapted to be lubricated by splash lubrication from the body of oil in the compressor crankcase. Also, oil collects on the cylinder wall 12 to provide for lubrication between the piston and the cylinder wall. Conventionally, in addition to the piston ring 22, illustrated in FIGS. 1 and 2, an additional piston ring is provided below the compression ring 22 specifically for the purpose of resisting seepage of oil past the piston into the compression chamber 12a. However, even when using a separate oil ring below the compression ring 22 on the piston, oil that is scraped from the cylinder wall by the ring becomes entrapped in the area between the compression ring and the oil ring as well as below the oil ring and in the end portions of the piston pin bore 17. It is conventional that the piston pin 16 does not extend completely to the periphery of the piston so that chambers 17a and 17b are created at opposite ends of the piston pin bore 17 between opposite ends of the piston pin 16 and the cylinder wall 12. Under normal operation of a gas compressor, this constant entrapment of oil gradually builds pressure in the entrapped areas until pressure of the entrapped oil is such as to force the entrapped oil past the oil ring normally provided on the piston as well as past the compression ring 22 with a substantial volume of oil being delivered into the compression chamber 12a, and thereby being discharged with the compressed gas into the high-pressure side of the pressure system.

Many ways have been considered for separating this discharged oil from the compressed gas and returning it to the crankcase of the compressor, but such devices are expensive and not fully satisfactory.

In this invention, therefore, the piston 15 is provided with oil relief grooves arranged in such a manner that oil entrapped in the manner heretofore described can flow directly to the crankcase of the compressor through the relief grooves and thereby prevent oil pressure developing in the entrapped body of oil. If oil pressure cannot be produced in the body of the entrapped oil, obviously the entrapped oil will not seep past the compression ring 22. Therefore, the arrangement is such as to eliminate the necessity for a separate oil ring and thereby reduces the cost of the piston, as well as eliminate a problem of oil seepage into the compression chamber 12a of the cylinder.

In this invention the piston 15 is provided with axially extending grooves 25 extending inwardly into the periphery of the piston, the grooves extending between the piston ring groove 20 and the piston pin bore 17. As shown in FIG. 2, the two grooves 25 are at diametrically opposite sides of the piston so that oil pressure relief can be made from the piston ring groove 20 to both chambers 17a and 17b at opposite ends of the piston ring 16.

The piston pin bore 17, that is the bearing surface formed by the piston pin bore for the piston pin 16, is provided with a plurality of grooves 26 that extend axially of the piston pin bore 17 from the outer end 27 of the piston pin bore to the inner end 28 thereof, the inner end communicating with the recess 18 provided centrally in the piston 15. These grooves 26 recessed into the bearing surface of the piston pin bore 17 cooperate with the exterior periphery of the piston pin 16 to form oil relief passages from the chambers 17a and 17b respectively, the oil entrapped in the chambers 17a and 17b discharging into the central recess area 18 in the piston and thereby into the cylinder chamber area 12b below the piston for return to the crankcase of the compressor. FIG. 4 illustrates a substantially enlarged cross section of the recess groove 26 provided in the bearing surface of the piston pin bore 17.

From the foregoing description it will be apparent that any oil that is entrapped below the compression ring 22 on the piston and in the chambers 17a and 17b at opposite ends of the piston pin will be permitted to flow from the area of entrapment into the interior of the piston and thereby find its way to the crankcase of the compressor. Obviously, provision of the relief passages 25 and 26 will prevent oil pressure to develop within the areas of oil entrapment and therefore the oil will not tend to seep past the compression ring 22.

Gas compressors, and particularly refrigeration compressors, constructed with the feature of this invention have shown substantially no oil seepage into the compression chamber 12a over extended periods of operation and under heavy-duty service.

While the embodiments of the present invention as herein disclosed constitute a preferred form, it is to be understood that other forms might be adopted.

What is claimed is as follows:

1. In a fluid compressor, the combination of, a cylinder member having a cylinder therein, a piston reciprocable in said cylinder, a closure member at one end of said cylinder and forming with said piston a fluid compression space therebetween, said piston having a single piston ring groove therein having a piston ring in the said groove engaging said cylinder to resist flow of compressed fluid from said compression chamber past said piston and flow of oil from within the compressor into said compression chamber, said piston also having a piston pin bore extending transversely thereof positioned below said piston ring groove and having a piston pin in the said bore, means forming an oil relief passage means from said ring groove to the end of said piston pin bore, and additional continuously open oil relief passage means in the periphery of said piston pin bore extending axially thereof between the surface of the piston pin bore and the piston pin therein and terminating at the inner end of said piston pin bore for relief flow of oil from the radially outer end of said piston pin bore to the radially inner end thereof relative to said piston for discharge internally of said piston and into said cylinder in which the piston reciprocates whereby to prevent entrapment of oil below said piston ring and in said piston pin bore with resultant oil pressure build-up at the piston ring.

2. A piston for use in a fluid compressor, comprising, a cylindrical body forming a piston body having a central axially extending recess therein adapted to receive one end of a connecting rod, said piston body having a piston pin bore extending transversely through the piston pin body and intersecting said central recess whereby the outer ends of said piston pin bore terminate at diametrically opposite sides of the piston and the inner ends of the piston pin bore terminate and communicate with the said central recess, said piston body having a single annular piston ring groove adjacent the top end thereof having a piston ring in said groove adapted for engagement with the wall of a cylinder in which said piston reciprocates, said piston having a plurality of axially extending grooves in the periphery thereof extending between the said piston ring groove and said piston pin bore with the said grooves spaced equidistantly around the periphery of the said piston, at least one of the said grooves communicating freely with the piston pin bore at each end thereof for relief of oil from the ring groove into the said piston pin bore at both ends of the said bore, and passage means recessed into the periphery of said piston pin bore axially thereof at opposite sides of the said central recess in communication with the said central recess in said piston to provide for relief flow of oil from both ends of said piston pin bore to the said central recess in said piston and thereby into the cylinder in which the said piston is adapted to reciprocate.

References Cited in the file of this patent

UNITED STATES PATENTS

| | | |
|---|---|---|
| 1,224,239 | Underwood | May 1, 1917 |
| 1,404,654 | Saxton | Jan. 24, 1922 |
| 1,618,805 | Brawner | Feb. 22, 1927 |
| 1,978,714 | Lentell | Sept. 30, 1934 |
| 2,022,905 | Vang et al. | Dec. 3, 1935 |
| 2,386,117 | Hvid | Oct. 2, 1945 |
| 2,522,764 | Roberts | Sept. 19, 1950 |
| 2,703,264 | Pitner | Mar. 1, 1955 |